April 14, 1925.
J. H. LINDSAY
CUTTING STICK
Filed Sept. 17, 1921
1,533,124
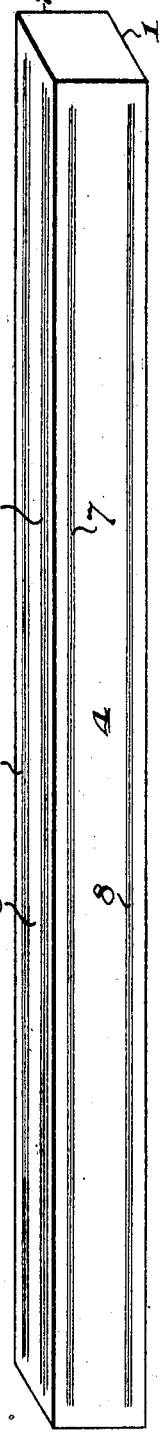
Inventor:
Joseph H. Lindsay,
By  Jno T Dowzdale
   Attorney.

Patented Apr. 14, 1925.

1,533,124

UNITED STATES PATENT OFFICE.

JOSEPH H. LINDSAY, OF WILMINGTON, DELAWARE.

CUTTING STICK.

Application filed September 17, 1921. Serial No. 501,492.

*To all whom it may concern:*

Be it known that I, JOSEPH H. LINDSAY, a citizen of the United States, residing at Wilmington, in the county of New Castle, State of Delaware, have invented a new and useful Cutting Stick, of which the following is a specification.

The invention relates to cutting sticks for standard sheet cutting machines. The object is to provide an improved cutting stick for use with straight cutting knives, and adapted to be turned and also reversed end to end so as to present to the cutting knife-edge a plurality of adjacent cutting surfaces that shall be equally efficient in co-operating with the cutting edge of the knife to secure a clean cut of the sheets even to the sheet lying next to the surface of the cutting stick.

The invention includes the utilization of certain substances in the formation or composition of the stick, which substances when properly acted upon have certain required characteristics, comprise for example a sufficient yielding to the knife-edge to maintain its cutting efficiency, and at the same time a sufficient toughness and coherence to resist a breaking down of its structure adjacent the line of cut, so that the surfaces of the stick, immediately adjacent the cutting lines shall present effective areas for cooperating with the knife.

The common practice in the art to which this invention belongs is to use cutting sticks of hard wood. The best of these woods have a grain or fiber in their structure which is affected for a substantial distance from the line of cut, on either side; with the result that the surface of the stick along the line of cut, under the action of the knife and the pressure of the adjacent sheets, soon becomes a channel of considerable width with rough and broken margins. This means a very rapid deterioration of the stick, and also a marring of the lower sheets, and a consequent waste of the material operated upon, such as paper sheets, since their severed edges become torn and ragged. A great waste of time and material in the necessity of frequent changing of the sticks is also a direct consequence of these conditions.

The substance which I have found most satisfactory from which to form or construct my improved cutting stick, is an artificial composition such as vulcanite fiber, or similar substance, having no grain or cell structures which extend in substantially parallel lines in direction of the longitudinal extension of the stick, as in wood. This is particularly significant in conection with long narrow cutting sticks where the knife cut or cutting line runs necessarily with the general direction of the grain, and where the action of the knife upon the stick is a repeated action on substantially the same line. This, as above stated, tends to mutilate the body of the wooden stick for a considerable distance on either side of the cutting line. This splitting or marring extends frequently even through the corner of the stick, so that not only adjacent surface portions on the same side or face, but even the adjacent sides of the stick are often rendered unavailable for further use.

While, in accordance with my invention, the stick may be turned on its longitudinal axis from face to face, and a plurality of portions of the same face can be made available by a suitable shifting of the stick, as, for example, by turning it end for end.

I am aware that such substance as vulcanite fiber is old, and used in many arts, even as a matrix for cutting and pressing dies, but as far as I am aware, the essential characteristics above described have never been utilized in connection with cutting sticks for straight-cut sheet-severing machines. My invention has resulted in a distinct advance in the art, by saving great waste of the stock operated upon, great waste in the material now used in forming the sticks, and also great waste in the time of the operator due to the frequent changing and renewing of the sticks.

In the drawing, the figure is a view in perspective of the stick in accordance with my invention.

The four longitudinal sides are indicated by the numerals 1, 2, 3 and 4, while the several sets of cutting lines 5, 6, 7 and 8, are indicated with the immediately adjacent surfaces unmarred and unimpaired.

The stick is formed of a compacted yet slightly yielding material that shall yield sufficiently to the knife edge as to preserve its efficiency and yet shall resist the tendency to crush, crack or split away from the line of cut of the knife, and thus preserve immediately adjacent surfaces for effective cooperation with the knife when the stick is shifted with respect to said line of cut.

What I claim is:—

A cutting stick having a plurality of knife-contacting surfaces of vulcanite fiber or its equivalent adapted to be reversed and shifted to present new lines of knife-contact and to resist the crushing action of the knife when engaging said surface on a line closely adjacent a former line of cut.

JOSEPH H. LINDSAY.